Figure 1:
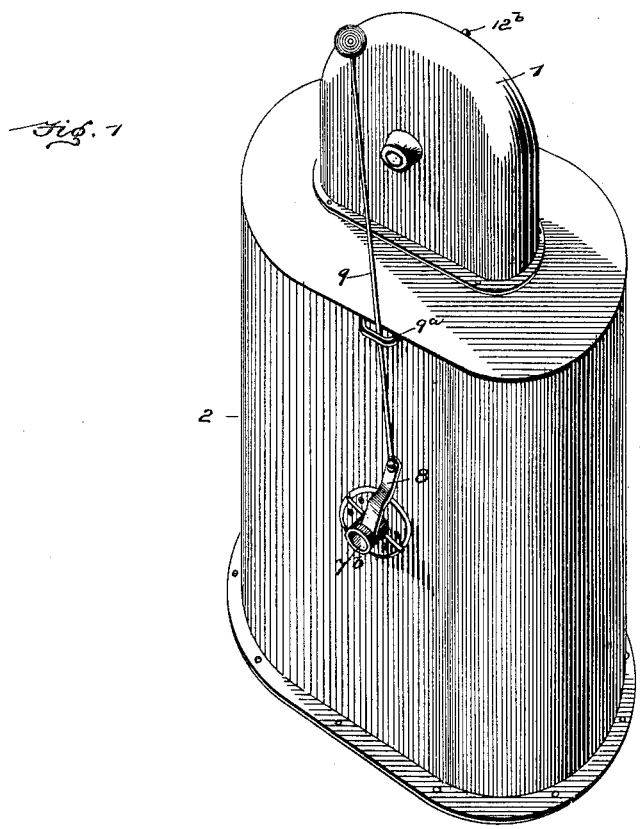

No. 657,841. Patented Sept. 11, 1900.
T. H. & C. H. TISE.
WATER HOIST.
(Application filed Nov. 13, 1899.)
(No Model.) 4 Sheets—Sheet 1.

Witnesses
Edwin B. H. Tower, Jr.
Herbert D. Lawson.

Inventors
Thomas H. Tise
Charles H. Tise
By Edson Bros,
Attorneys

No. 657,841.  
T. H. & C. H. TISE.  
WATER HOIST.  
(Application filed Nov. 13, 1899.)  
Patented Sept. 11, 1900.

(No Model.)  
4 Sheets—Sheet 2.

Witnesses  
Edwin B. H. Tower, Jr.  
Herbert K. Lawson

Inventors  
Thomas H. Tise  
and  
Charles H. Tise.  
By Edson Bro's,  
Attorneys No. 657,841. Patented Sept. 11, 1900.
T. H. & C. H. TISE.
WATER HOIST.
(Application filed Nov. 13, 1899.)
(No Model.) 4 Sheets—Sheet 3.

Witnesses
Edwin B. H. Tower, Jr.
Herbert A. Lawson.

Inventors
Thomas H. Tise
Charles H. Tise
By Edson Bros,
Attorneys

THE NORRIS PETERS CO., PHOTO-LITHO., WASHINGTON, D. C.

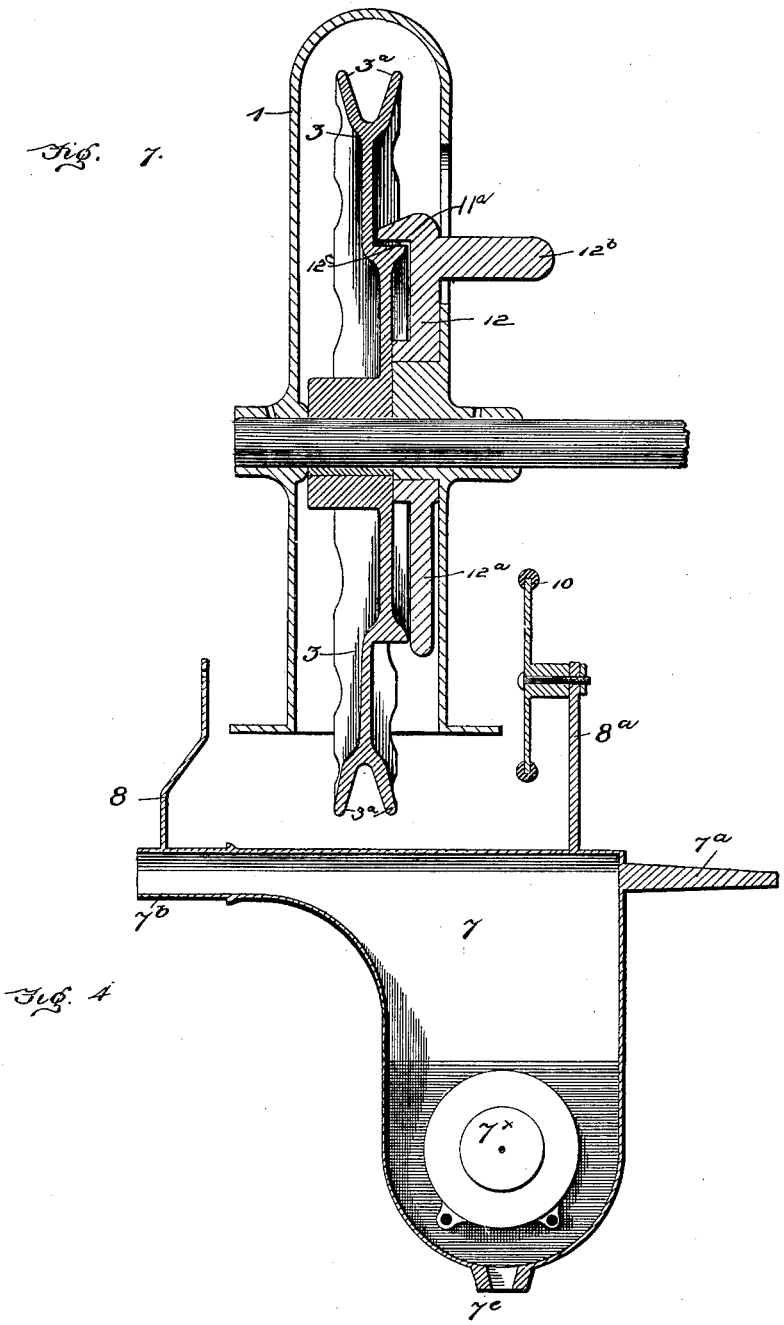

UNITED STATES PATENT OFFICE.

THOMAS HENERY TISE AND CHARLES HENRY TISE, OF WINSTON, NORTH CAROLINA, ASSIGNORS TO THOMAS H. TISE.

WATER-HOIST.

SPECIFICATION forming part of Letters Patent No. 657,841, dated September 11, 1900.

Application filed November 13, 1899. Serial No. 736,800. (No model.)

*To all whom it may concern:*

Be it known that we, THOMAS HENERY TISE and CHARLES HENRY TISE, citizens of the United States, residing at Winston, in the county of Forsyth and State of North Carolina, have invented certain new and useful Improvements in Water-Hoists; and we do hereby declare the following to be a full, clear, and exact description of the invention, such as will enable others skilled in the art to which it appertains to make and use the same.

Our invention relates to improvements in well-bucket or water hoists.

It has for its object to promote simplicity and compactness of construction, to secure efficiency of operation, and to facilitate the drawing and discharge of the water.

It consists, primarily, of a well-bucket having a valved bottom, a tilting or pivoted pan or receptacle having a lateral water-inlet adapted to be engaged and initially tilted by said bucket, and means to effect the further tilting of said pan, causing it to engage and open the valve of the well-bucket to effect the discharge of its contents or water into said pan as the latter engages said valve, also of a peculiarly-constructed sheave and brake or grip, substantially as hereinafter more fully described, and specifically pointed out in the claims.

Figure 6:
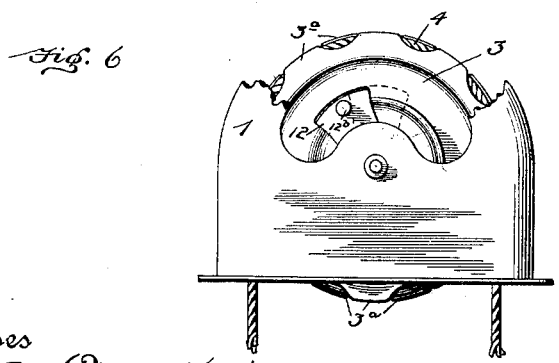
Figure 2:
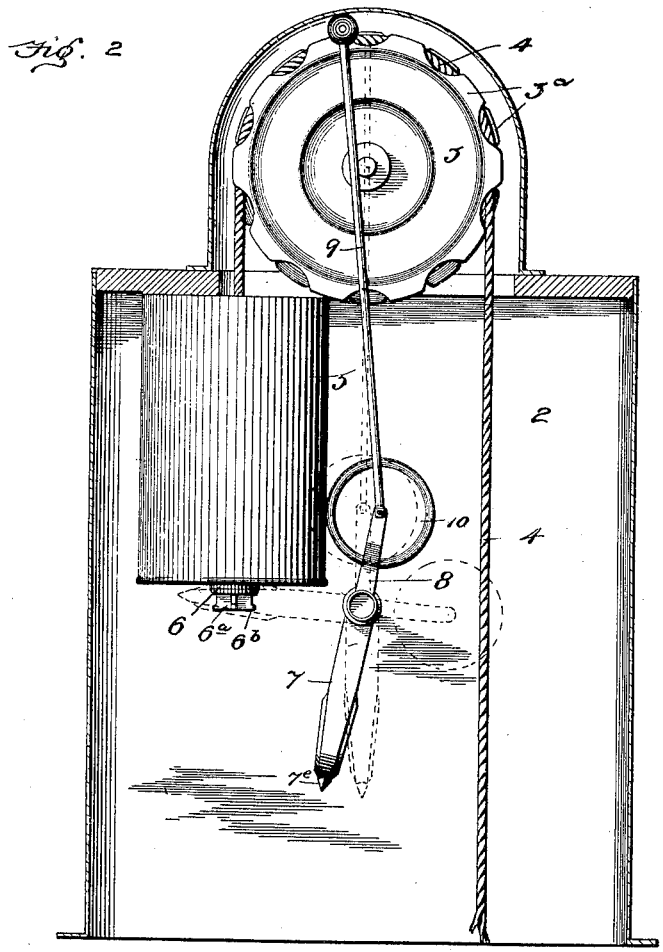
Figure 8:
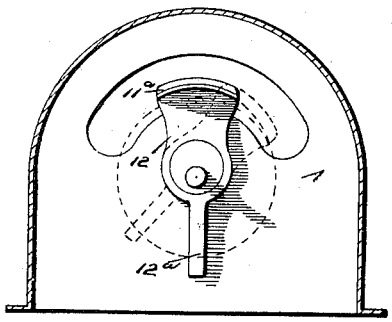
Figure 3:
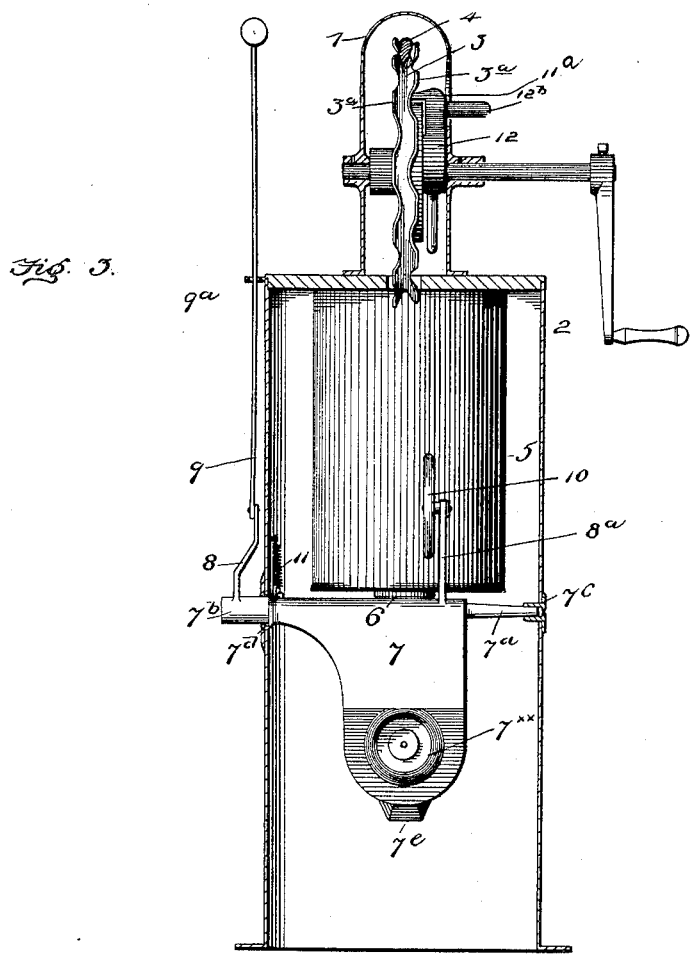
Figure 5:
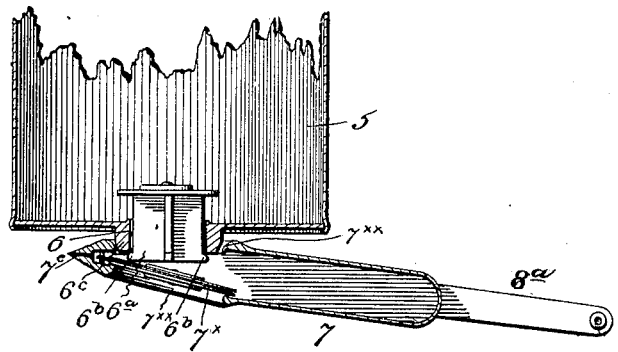

In the accompanying drawings, illustrating the preferred embodiment of our invention, Figure 1 is a perspective view of the device. Fig. 2 is a side elevation of the interior mechanism of the hoist. Fig. 3 is a vertical transverse section. Fig. 4 is a longitudinal section through the pan. Fig. 5 is a transverse section through the pan and a portion of a bucket. Fig. 6 is a view of the pulley and its brake. Fig. 7 is an enlarged section through the brake and the hoist sheave or pulley. Fig. 8 is an inner elevation of the brake.

Latitude is allowed herein as to details, as they may be changed without departing from the spirit of our invention and the same yet remain intact and be protected.

In the organization of our invention we mount within a housing 1, suitably secured in position upon the top of the well-curb 2, a pulley or sheave 3, over which is passed the hoisting rope or chain 4, to each end of which is connected in practice a well-bucket 5, said wheel being actuated by a suitable crank, as usual. The pulley or sheave 3 has its periphery armed or provided with a series of alternating tooth-like projections or studs $3^a$ $3^a$, so arranged as to form substantially a waved or serpentine groove to receive and permit the passage therethrough of the hoisting rope or chain. This has the effect to greatly lessen the liability of said rope to slip when frosted or adhering to said pulley or sheave when ice-clad from the freezing of drip-water thereon, as would otherwise be the case. Each bucket has a valve 6 arranged in its bottom, with its stem $6^a$ depending therefrom to adapt it by contact with the water or the resistance thereof to effect the automatic opening of the valve, and thus admit water to and permit the filling of the bucket or buckets. The valve-stem is slightly laterally extended, as at $6^b$, at its extreme lower end to engage, after a sufficient movement of the valve to permit its opening, a surrounding downward extension $6^c$ on the bottom of the bucket to properly retain the valve in position. The upward movement of the well-buckets is limited by engagement or contact with the well-curb top, as shown.

Suitably pivoted or hung within the well-curbing by a lateral cylindric axial extension or stud $7^a$ and its opposite lateral spout extension $7^b$ is a pan or receptacle 7 to receive the contained water of the well-bucket when discharged therefrom and to properly pass or deliver the water into a pail or other vessel suitably disposed for that purpose. Bearings or castings $7^c$ $7^d$ are suitably secured in place in the curbing to receive the axial extension or stud $7^a$ and the spout extension $7^b$ of said pan or receptacle, as shown. The pan or receptacle 7 has two upward extensions or arms 8 $8^a$, respectively, one bearing a rubber tired or cushioned disk or wheel 10, adapted to engage with the side of the bucket to initially deflect said pan from its vertical position necessary to the tilting or moving thereof into a horizontal position for the discharge or delivery of its contents, as will be presently seen. The pan or receptacle 7 has near its bottom a gravity or lower-edge pivoted valve $7^x$, arranged intermediately of opposite lateral openings 7×× in said pan, the bottom of said pan having a drain opening or outlet 7ᵉ. To the other arm 8 of said pan or receptacle is connected a push rod or lever 9, passing through an eye or guide 9ᵃ at the top of the curb and up within convenient reach of the operator to permit, as the bucket reaches its highest point or contacts with the curb top and the pan has been initially tilted or deflected thereby, as above pointed out, by pushing down upon said rod the moving of said pan into a horizontal position. This action of parts effects engagement of the bucket-valve with the valve of the pan, opening the former valve and permitting the discharge of the water of the bucket in whole or part, as may be desired, into the pan through the opposite opening of the latter valve, it finally flowing from the pan into a bucket or other vessel, as aforesaid. Of course the flow or delivery of the water from said pan or receptacle is regulated according to the extent of the application of the pressure of the hand to the push rod or lever 9. A spring 11, suitably secured to the curbing or a fixture and to said pan or receptacle, has the effect to automatically and effectively return the latter to its former or vertical position after release of the push rod or lever.

In order to properly lock or hold the hoist sheave or pulley in place, we employ a brake 12, eccentrically fulcrumed upon the sheave-axle bearing and having a shoe or segmental portion 11ᵃ, adapted to impinge or engage a lateral circular flange 12ᶜ, cast on said sheave adjacent to the center, whose action is exerted inward toward the center of the sheave or its axis. This avoids outward thrust or pressure on the sheave or pulley in applying the brake as where a lateral peripheral flange is employed, as heretofore. The brake 12 has a counterbalancing extension or arm 12ᵃ and a handle 12ᵇ for its manipulation, said arm or extension having the effect to hold the brake or lock in proper relation to the lateral flange or extension 12ᶜ of the sheave or pulley 3 normally and to prevent any tendency thereof to "hang" or become difficult to reverse when the brake or lock has become worn. This lock or brake permits of a more compact and durable construction, and since it clamps toward the center it allows of a much lighter and better-designed wheel and eliminates the liability of breakage, which is quite prevalent with the old style. This lock or brake sheds and will not retain water, whereas the inner side of the normally-lower portion of the old form of peripheral flange acts as a trough to retain the water, which freezes in cold weather and causes the lock to become inoperative until the ice is removed.

Having thus fully described our invention, what we claim, and desire to secure by Letters Patent, is—

1. In a hoist of the character described, a tilting or pivoted pan or receptacle having a delivery or discharge spout adapted to serve as a pivot, and an opposite pivot, and provided with a lateral valved water-inlet, and means to actuate said pan, substantially as set forth.

2. In a hoist of the character described, the well-bucket having a valved bottom, a tilting or pivoted pan or receptacle having a lateral valved water-inlet adapted to receive the water from said bucket, via its valve, and means to actuate said pan and bucket, substantially as set forth.

3. In a hoist of the character described, the combination of a well-bucket having a valve in its bottom, a tilting or pivoted pan or receptacle having a lateral valved water-inlet and adapted to open said bucket-valve, and means for actuating said bucket and pan, substantially as specified.

4. In a hoist of the character described, the combination of a well-bucket having a valved bottom, a tilting or pivoted pan or receptacle having a lateral valved water-inlet and carrying means adapted to be acted upon by said bucket to initially tilt or deflect said pan, and means to operate said bucket and pan, substantially as set forth.

5. In a hoist of the character described, the combination of a well-bucket having a valved bottom, a tilting or pivoted pan or receptacle having a lateral water-inlet and adapted to open said valve to allow the contents of said bucket to pass into said pan, a wheel carried by said pan and adapted to be engaged by said bucket to initially tilt or deflect said pan, and means to operate said bucket and pan, substantially as described.

6. In a hoist of the character described, the combination of a well-bucket having a valved bottom, a tilting or pivoted pan or receptacle having a lateral water-inlet and adapted to open said valve and having an arm carrying a wheel or disk engaged by said bucket to initially tilt or deflect said pan, and means to actuate said bucket and pan, substantially as specified.

7. In a hoist of the character described, the combination of a well-bucket having a valved bottom, a tilting or pivoted pan or receptacle having a lateral water-inlet and adapted to open said valve, and carrying means acted upon by said bucket to initially tilt said pan, and a push-rod connected to said pan, substantially as set forth.

8. In a hoist of the character described, the combination of a sheave having an intermediate annular flange, a brake or lever having an outer end lateral flange adapted to engage the outer surface of said annular flange, and an eccentric adapted to form the bearing of the shaft of said sheave, with its greater radius arranged next to said flange of lever and embraced by said lever or brake, substantially as set forth.

9. In a hoist of the character described, the combination of a sheave having an intermediate annular flange, a brake or lever having an outer end lateral flange, adapted to engage the outer surface of said annular flange, and having a lateral handle or projection and a counterbalancing-arm, and an eccentric adapted to form the bearing of the shaft of said sheave, with its greater radius arranged next to said flange of lever and embraced by said lever or brake, substantially as set forth.

In testimony whereof we affix our signatures in presence of two witnesses.

THOMAS HENERY TISE.
CHARLES HENRY TISE.

Witnesses:
P. W. CRUTCHFIELD,
W. E. GRIFFIN.